(12) United States Patent
Ishikawa et al.

(10) Patent No.: US 7,909,701 B2
(45) Date of Patent: Mar. 22, 2011

(54) POWER TRANSMISSION APPARATUS

(75) Inventors: Keiji Ishikawa, Okazaki (JP); Yasuo Tabuchi, Toyoake (JP); Michiyasu Nosaka, Anjo (JP); Yoshihiro Nakata, Kariya (JP); Takayuki Suzuki, Hekinan (JP)

(73) Assignee: DENSO CORPORATION, Kariya (JP)

( * ) Notice: Subject to any disclaimer, the term of this patent is extended or adjusted under 35 U.S.C. 154(b) by 407 days.

(21) Appl. No.: 12/078,198

(22) Filed: Mar. 27, 2008

(65) Prior Publication Data
US 2008/0314709 A1 Dec. 25, 2008

(30) Foreign Application Priority Data
Mar. 30, 2007 (JP) ................................. 2007-093770

(51) Int. Cl.
*F16D 9/00* (2006.01)

(52) U.S. Cl. ........................................ 464/32; 192/56.5

(58) Field of Classification Search ................... 464/32; 192/56.5; 403/2, 11; 417/319; 474/70, 902, 474/903
See application file for complete search history.

(56) References Cited

U.S. PATENT DOCUMENTS

| 6,332,842 | B1 * | 12/2001 | Tabuchi et al. | 464/33 |
| 6,722,993 | B2 * | 4/2004 | Tabuchi et al. | 464/34 |
| 6,913,538 | B2 * | 7/2005 | Tabuchi et al. | 464/32 |
| 6,918,835 | B2 * | 7/2005 | Aoki et al. | 464/32 |
| 2002/0198056 | A1 * | 12/2002 | Tabuchi et al. | 464/32 |
| 2004/0063503 | A1 * | 4/2004 | Aoki et al. | 464/32 |
| 2006/0089201 | A1 | 4/2006 | Nosaka et al. | |
| 2006/0089224 | A1 * | 4/2006 | Nosaka et al. | 474/170 |

FOREIGN PATENT DOCUMENTS

| JP | A-2000-161383 | 6/2000 |
| JP | A-2001-248689 | 9/2001 |
| JP | A-2002-349596 | 12/2002 |
| JP | A-2004-239186 | 8/2004 |
| JP | A-2006-153258 | 6/2006 |
| JP | A-2007-113646 | 5/2007 |
| JP | A-2007-120611 | 5/2007 |

* cited by examiner

*Primary Examiner* — Aaron Dunwoody
(74) *Attorney, Agent, or Firm* — Posz Law Group, PLC

(57) ABSTRACT

A power transmission apparatus comprises a pulley mounted rotatably on a casing of a rotary device, a hub coupled to the pulley by fitting between depressions and protrusions, a power shutoff member for preventing excessive torque between a rotary shaft and the hub, and an engaging device for engaging the hub and the pulley each other. The engaging device includes a first stepped portion formed radially on the outer periphery of the hub and a second stepped portion formed radially on the inner peripheral wall of a rim of the pulley in such a manner as to engage the first stepped portion in the axial direction.

8 Claims, 6 Drawing Sheets

FRONT ←→ REAR

FRONT ⟵⟶ REAR

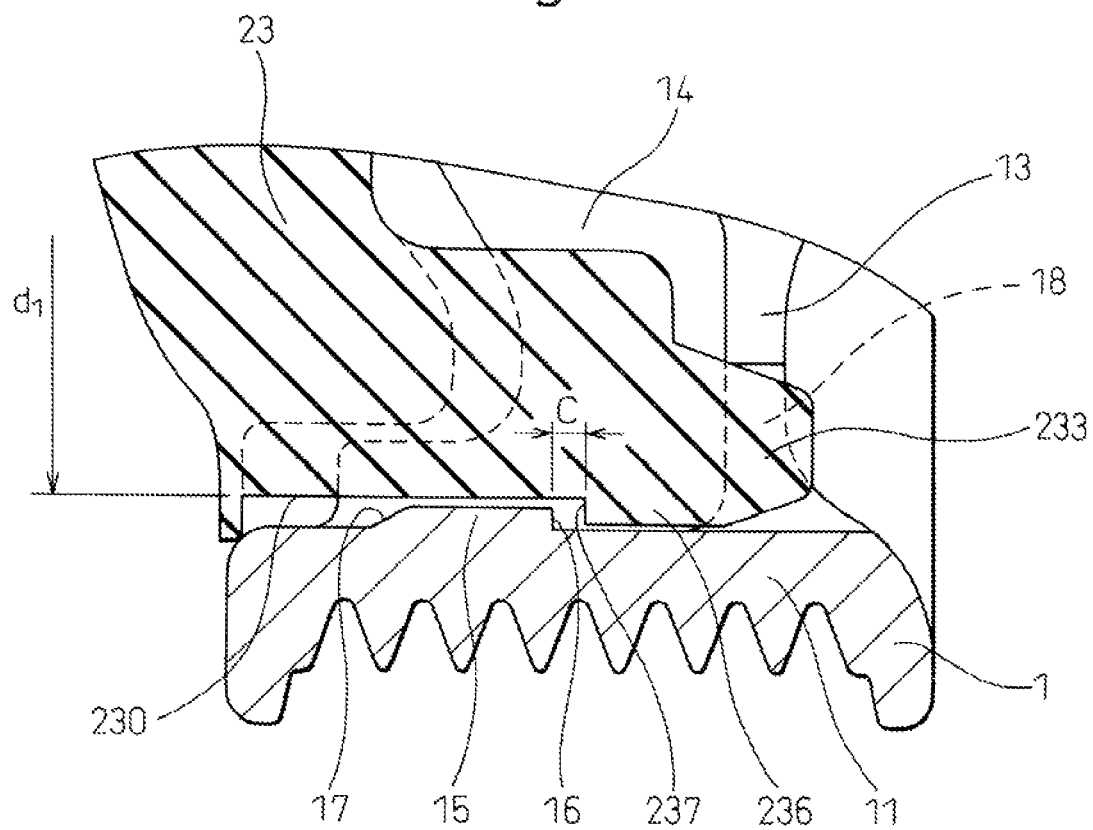

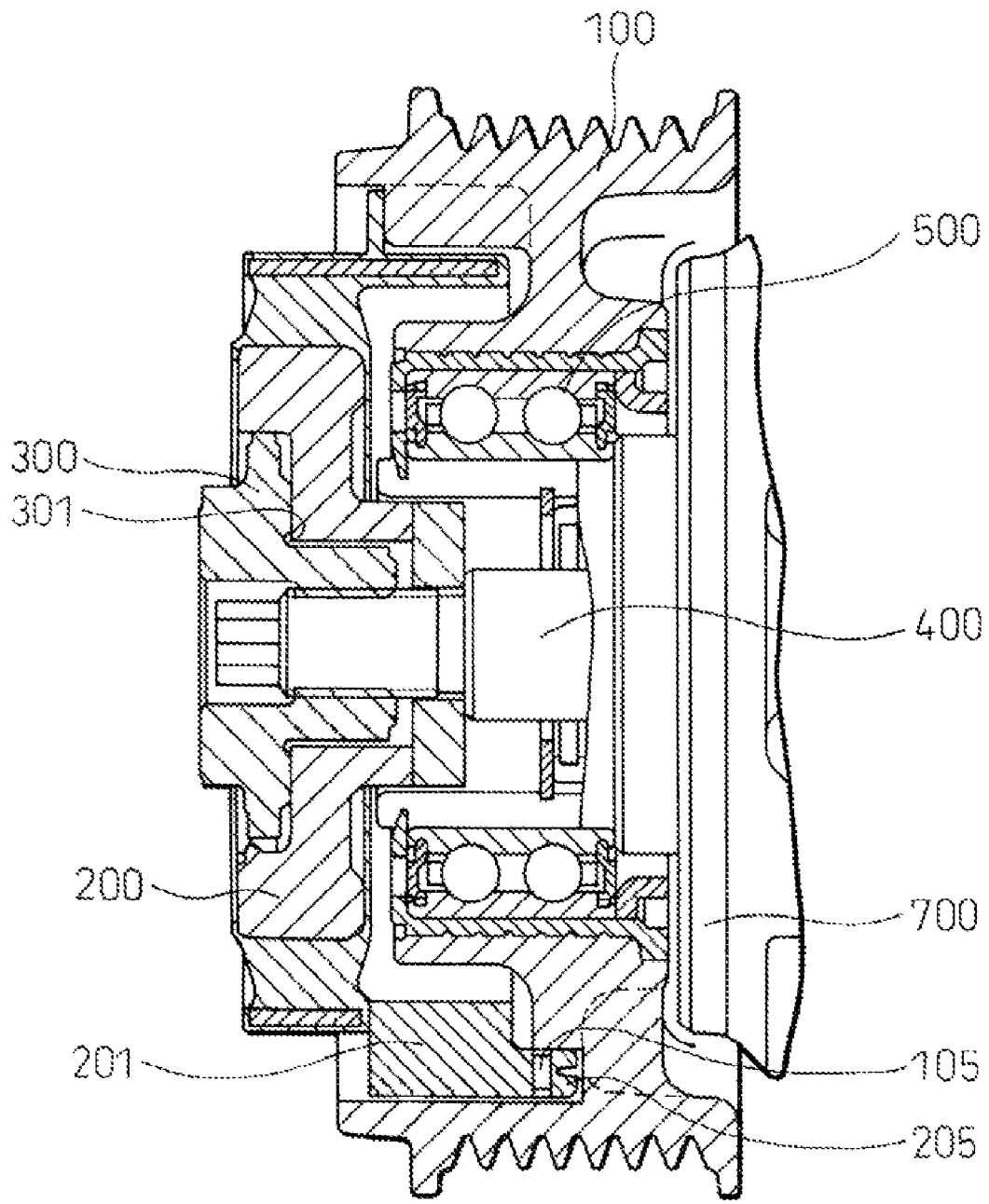

POWER TRANSMISSION APPARATUS

BACKGROUND OF THE INVENTION

1. Field of the Invention

This invention relates to a power transmission apparatus having a torque limiter function, or in particular a power transmission apparatus suitably applicable to a compressor of an automotive air conditioning system operated through a belt or the like from an external power source such as an engine.

2. Description of the Related Art

FIG. 6 is a longitudinal sectional view of a power transmission apparatus for transmitting power to a compressor from an engine or motor, described in Japanese Patent Application No. 2005-304627 filed by the present applicant. The power transmission apparatus of this type, as shown, includes a pulley 100 constituting a driving-side rotary member for acquiring driving power from the engine or the like, a power shutoff member 300 constituting a torque limiter and hub 200 constituting a driven-side rotary member fixed to a rotary shaft 400 of the compressor. Pulley 100 is supported rotatably on a casing 700 of the compressor through a bearing 500, and hub 200 is coupled by being inserted into pulley 100. Power shutoff member 300 is provided for preventing secondary problems, such as breakage of a belt due to excessive torque which may be generated by, for example, the seizing of the compressor, and has a breakable portion 301 to disconnect by breaking the power transmission path at the time of an excessive torque generation.

The power transmission apparatus of this type is normally required to have the torque damper function for decreasing an abrupt change in transmission torque, and for this purpose, includes a hub-side protrusion 201 formed of an elastic material such as rubber arranged on the hub side. Hub 200 and pulley 100 are coupled to each other by fitting hub-side protrusion 201 and the depression formed on pulley 100 with each other, so that torque is transmitted through the protrusion and the depression.

In the case where excessive torque is generated in the power transmission apparatus having this structure, power shutoff member 300 is activated and breaks the breakable portion. After power shutoff member 300 breaks, pulley 100 and hub 200 are simply in a state with the protrusion inserted in the depression, and therefore hub 200 easily comes off from pulley 100.

For this reason, an anti-separation means has been proposed for the power transmission apparatus shown in FIG. 6. This anti-separation means is composed of a hook-shaped protrusion 205 projected axially from the rear end surface of hub-side convexo-concave portion 201 of hub 200 and an insertion hole 105 on the side of pulley 100 into which the protrusion is inserted and engaged. In this case, protrusion 205 is inserted into and through insertion hole 105 to assure axial engagement. However, this anti-separation means, has a problem that the die is complicated in order to form the hook-shaped protrusion for an increased die cost. Another problem is that the rotary shaft portion of the protrusion 205 is comparatively small in diameter and therefore easily compressed and deformed in the axial direction by the resistance against the insertion of protrusion 205 into insertion hole 105, with the result that protrusion 205 cannot be easily pushed into an engageable position and the assembly time is lengthened.

SUMMARY OF THE INVENTION

This invention has been achieved in view of the problems of the prior art described above, and the object thereof is to provide a power transmission apparatus low in fabrication cost that includes an engaging means for preventing the hub from coming off after the operation of the power shutoff member.

This invention provides the power transmission apparatus described in each of the appended claims as a technical means for achieving the object described above.

According to one aspect of the invention, there is provided a power transmission apparatus comprising a pulley (1) mounted rotatably on a casing (6) of a rotary device having a rotary shaft (4), a hub (2) coupled to pulley (1) by fitting between depressions and protrusions to transmit the torque with pulley (1), a power shutoff member (3) for shutting off the transmission of an excessive torque between rotary shaft (4) and hub (2), and an engaging means for causing hub (2) to engage pulley (1) to prevent hub (2) from coming off from pulley (1) after the activation of the power shutoff member (3), wherein the engaging means includes a first stepped portion (237) formed in radial direction on the outer periphery of hub (2) and a second stepped portion (16) formed in radial direction on the inner peripheral wall of a rim portion (11) of pulley (1) to engage first stepped portion (237) in the axial direction.

In this configuration, even in the case where power shutoff member (3) breaks down, first stepped portion (237) of hub (2) is engaged by second stepped portion (16) formed on pulley (1), and therefore hub (2) is prevented from coming off from pulley (1). In view of the fact that first stepped portion (237) is formed on the outer peripheral surface of hub (2), the die structure to form hub (2) as a molded component is simplified, while at the same time easily increasing the amount of radially inward deformation of first stepped portion (237), thereby realizing a secure engaging means high in assembly efficiency and having a large amount of engagement on the first and second stepped portions.

According to another aspect of the invention, there is provided a power transmission apparatus, wherein hub (2) may include an elastic member (23) having a protrusion adapted to be fitted in the depression of pulley (1). In this configuration, the change in the torque transmitted can be absorbed by the elastic member.

According to still another aspect of the invention, there is provided a power transmission apparatus, wherein pulley (1) may include a disk portion (13) extending in the radial direction and a coupling hole (18) formed through disk portion (13), and wherein hub (2) may have an axial protrusion (233) projected in axial direction from one end surface (232) of hub (2) facing disk portion (13) of pulley (1) and adapted to be fitted into coupling hole (18).

In this configuration, the torque can be transmitted also by way of the fitting portion between axial protrusion (233) of hub (2) and coupling hole (18) of pulley (1). Further, the fitting friction at the fitting portion provides resistance against the axial movement of hub (2) and therefore preventing hub (2) from coming off.

According to yet another aspect of the invention, there is provided a power transmission apparatus, wherein pulley (1) preferably includes disk portion (13) extending in the radial direction and coupling hole (18) formed through disk portion (13), and wherein coupling hole (18) formed in pulley (1) and second stepped portion (16) preferably coincide with each other in the angular position along the circumferential direction. As a result, in the case where pulley (1) is fabricated as a molded component, a die to form the second stepped portion through coupling hole (18) can be used and the slide structure otherwise required to mold second stepped portion (16) is eliminated, thereby simplifying the die structure for the pulley.

According to a further aspect of the invention, there is provided a power transmission apparatus, wherein a plurality of coupling holes (18) and axial protrusions (233) are arranged at intervals along the circumferential direction. There may also be provided a plurality of engaging means and coupling holes (18) at intervals along the circumferential direction. As a result, pulley (1) and hub (2) can be fitted with each other more strongly.

The reference numerals inserted in the parentheses following the names of the respective means described above represent an example of the correspondence with the specific means described in the appended claims.

The present invention may be more fully understood from the description of preferred embodiments of the invention, as set forth below, together with the accompanying drawings.

BRIEF DESCRIPTION OF THE DRAWINGS

FIG. 5 is a longitudinal sectional view showing a part of FIG. 1 in detail.

FIG. 6 is a longitudinal sectional view of the conventional power transmission apparatus.

DESCRIPTION OF THE PREFERRED EMBODIMENTS

Figure 1:
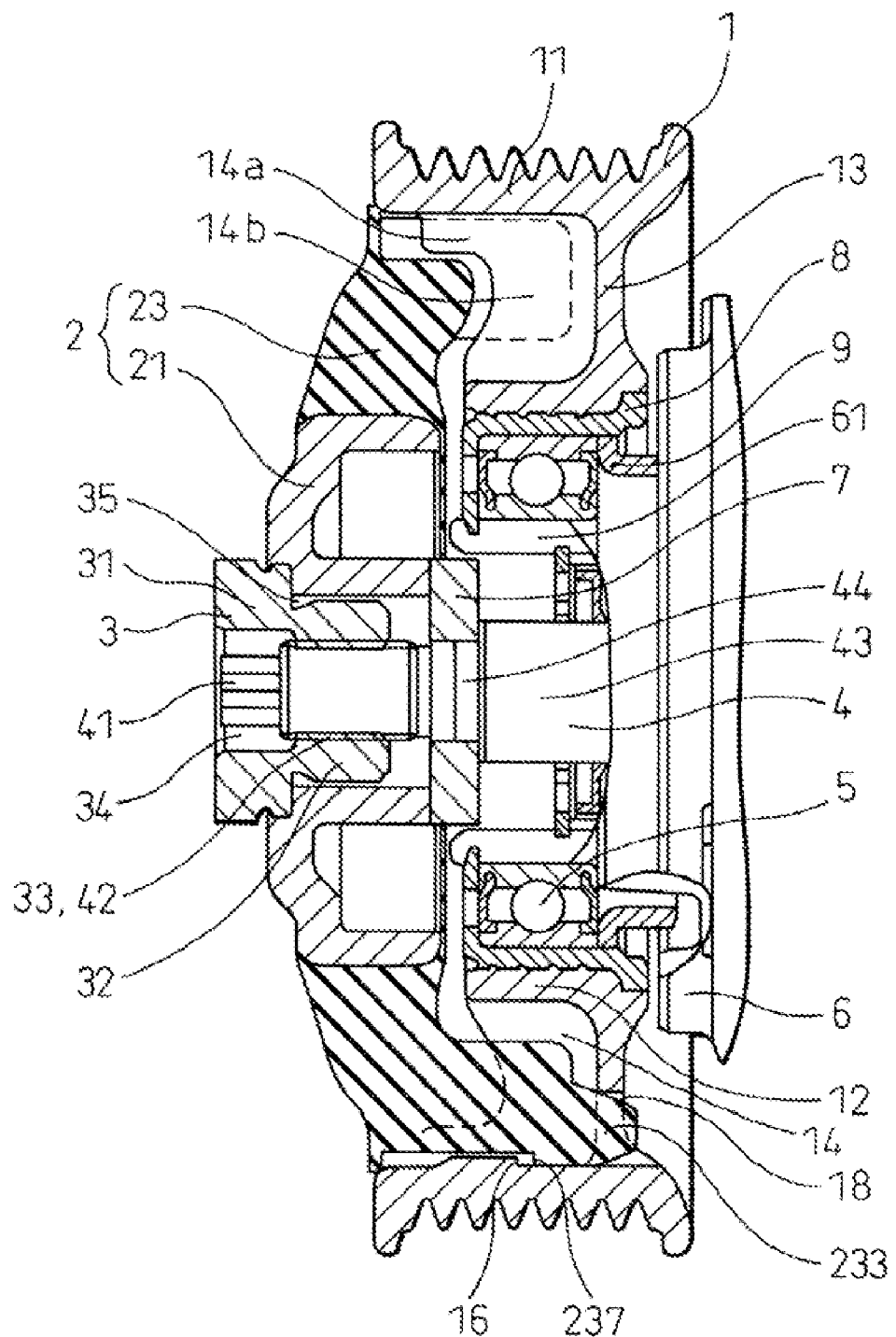
FIG. 1 is a longitudinal sectional view showing the power transmission apparatus according to an embodiment of the invention and a related rotary shaft.
Figure 2:
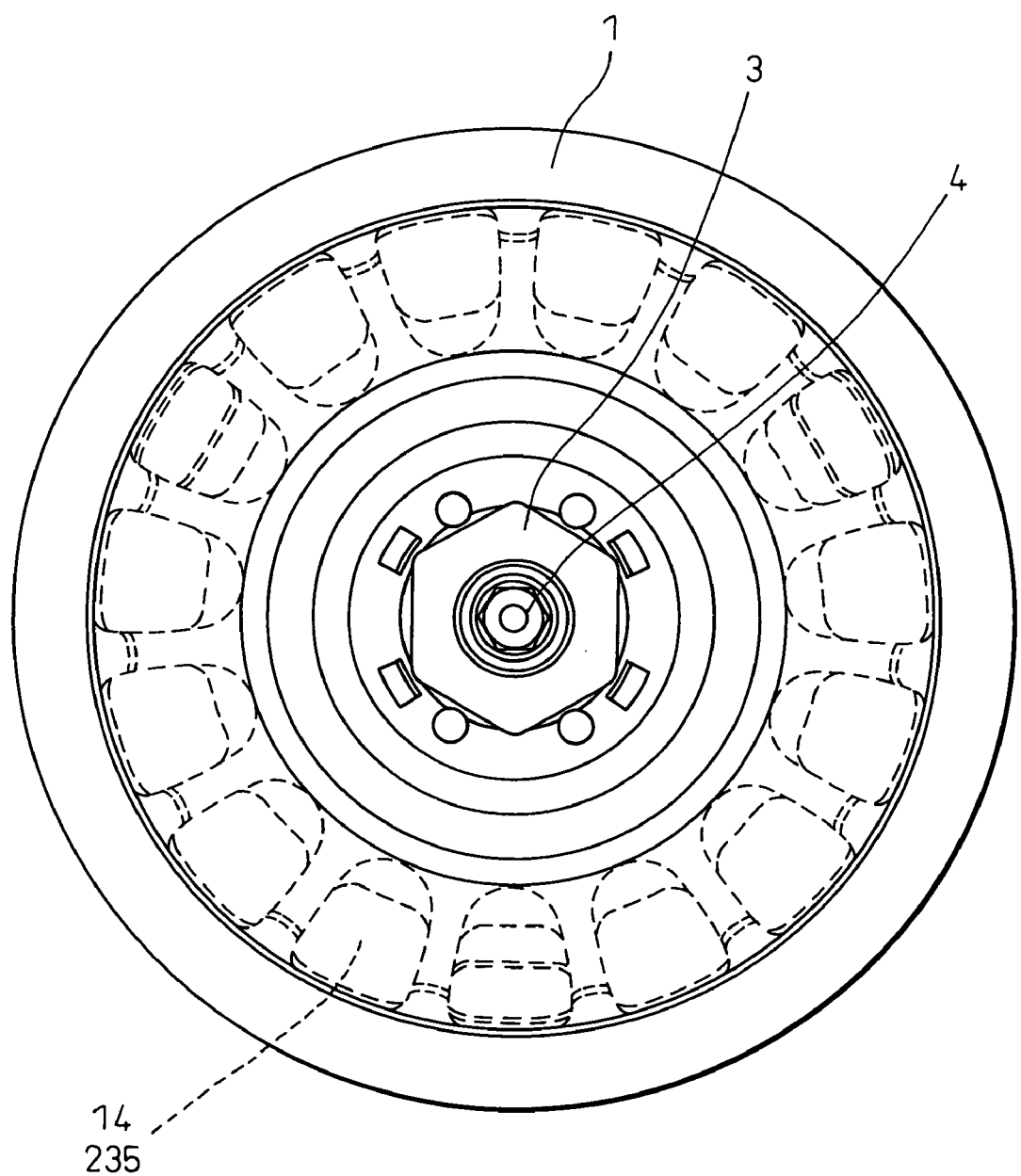
FIG. 2 is a front view of the power transmission apparatus and the rotary shaft shown in FIG. 1.

The preferred embodiments of the invention will be explained below with reference to the drawings. The power transmission apparatus according to the invention is suitably used by being assembled on the compressor of an automotive air conditioning system. Although the description that follows assumes that the power transmission apparatus is assembled on the compressor, the power transmission apparatus according to the invention may be used as mounted on rotary devices other than the compressor as required. FIG. 1 is a longitudinal sectional view showing the power transmission apparatus according to an embodiment of the invention and the rotary shaft of the compressor, and FIG. 2 a front view as taken from the front side in FIG. 1.

The power transmission apparatus according to this invention includes a pulley 1 constituting a driving-side rotary member for acquiring the drive force from an engine or a motor, a hub constituting a driven-side rotary member coupled to the pulley by fitting between depressions and protrusions and fixed on a rotary shaft 4 of the compressor, a power shutoff member 3 providing a torque limiter, and an engaging means for preventing the hub from coming off after the operation of power shutoff member 3, wherein the power (torque) is transmitted from pulley 1 to rotary shaft 4. Pulley 1, hub 2 and power shutoff member 3 are arranged on the same axis.

As shown in FIG. 1, pulley 1 includes a rim portion 11 with a belt wound on the outer periphery thereof for receiving the power, an annular rib portion 12 axially extending in ring form to hold a bearing 5 and improve the stiffness of pulley 1 and a disk portion 13 for coupling rim portion 11 and annular rib portion 12 to each other. Pulley 1 is mounted rotatably, through bearing 5 and a snap ring with sleeve ring 8, on a boss portion 61 arranged at one end of casing 6 of the compressor. This pulley 1 is preferably formed of a thermosetting synthetic resin. Normally, pulley 1, snap ring with sleeve 8, and bearing 5 are integrated by insertion molding. The belt (not shown) is wound on the outer peripheral surface of rim portion 11 of pulley 1, which in turn is rotated by the power from an external source such as an engine or a motor. Bearing 5 is prevented from moving in the axial direction by snap ring with sleeve ring 8 fitted in the groove formed on the outer peripheral surface of boss portion 61, an end of boss portion 61 and a ring member 9 fitted in snap ring with sleeve ring 8. Casing 6 and rotary shaft 4 are sealed by a rotary shaft sealing unit to prevent the refrigerant or oil from leaking out. This rotary shaft sealing unit is also prevented from moving axially by another snap ring fitted in the groove formed on the inner peripheral surface of boss portion 61.

The forward end portion of rotary shaft 4 of the compressor is projected toward the front side in FIG. 1 from casing 6, and in the order from the forward end, includes a tool-like portion 41 in the form of a hexagonal column, a male screw portion 42 formed with a male screw on the outer periphery thereof, a larger diameter portion 43 having a larger diameter than male screw portion 42 and a middle-diameter shaft portion 44 not threaded between male screw portion 42 and larger diameter portion 43. A washer 7 is inserted into middle-diameter shaft portion 44, and held between the rear surface of the hub and the stepped portion formed between the middle-diameter shaft portion 44 and the larger diameter portion 43.

Power shutoff member 3 is fixed on rotary shaft 4 and has a stepped form including a larger diameter hexagonal flange portion 31 and a smaller diameter portion 32. A center hole 34 with a female screw is formed through the center of power shutoff member 3. Further, an annular notch portion 35 smaller in diameter than smaller diameter portion 32 is formed between flange portion 31 and smaller diameter portion 32. Annular notch portion 35 is formed in such a manner as to break down under the axial force due to excessive torque which may be imposed on power shutoff member 3.

Power shutoff member 3 is fixed on rotary shaft 4 by forcing female screw portion 33 of center hole 34 onto male screw portion 42 of rotary shaft 4. By forcibly mounting power shutoff member 3 in this way, an inner hub 21 of hub 2, described later, arranged on the outer periphery of power shutoff member 3 is fastened by the stepped portion of power shutoff member 3 and the front end surface of washer 7 and fixed indirectly on rotary shaft 4.

Figure 3:
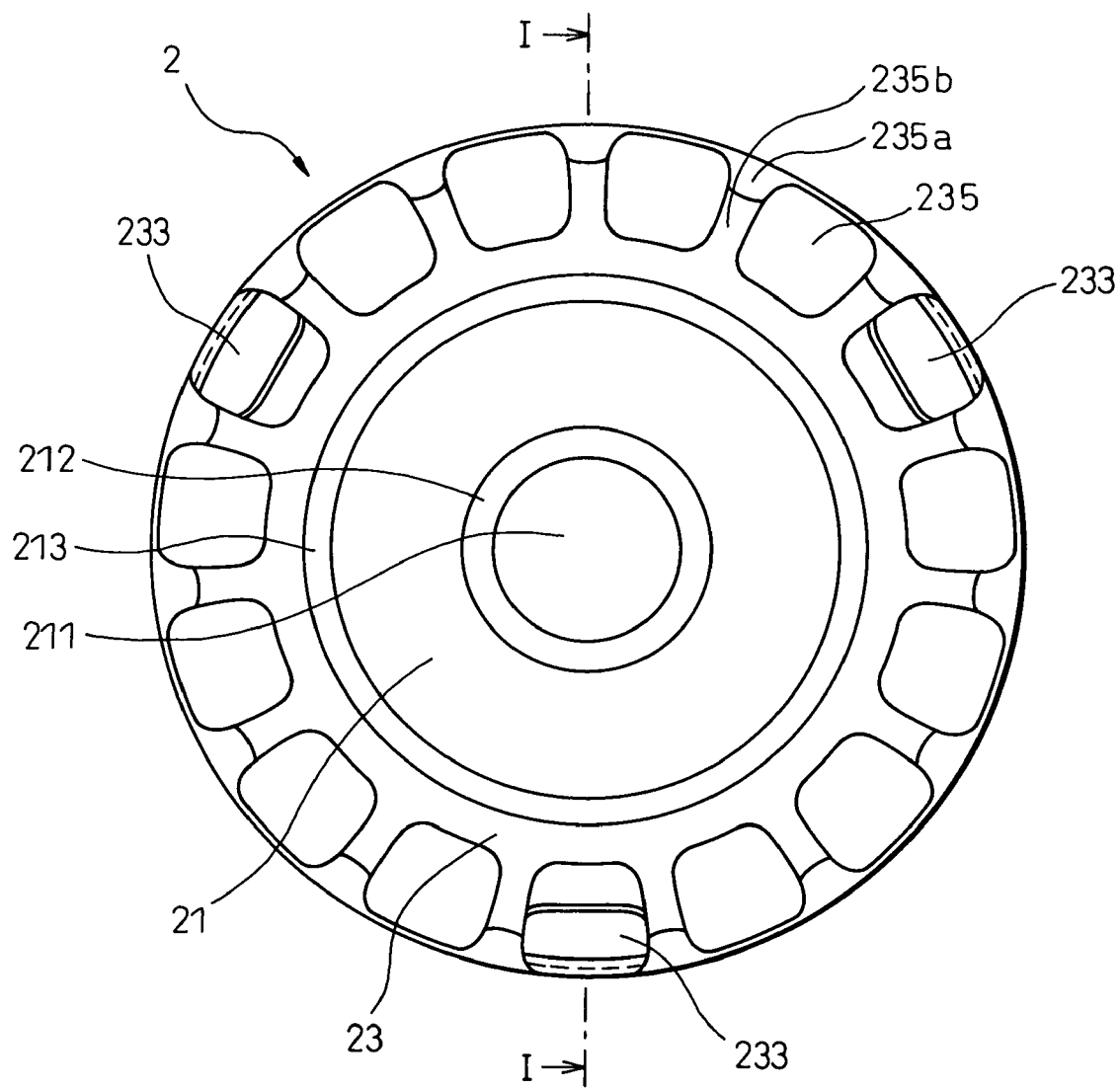
FIG. 3 is a front view of the power transmission apparatus as taken from the rear side of the hub.
Figure 4:
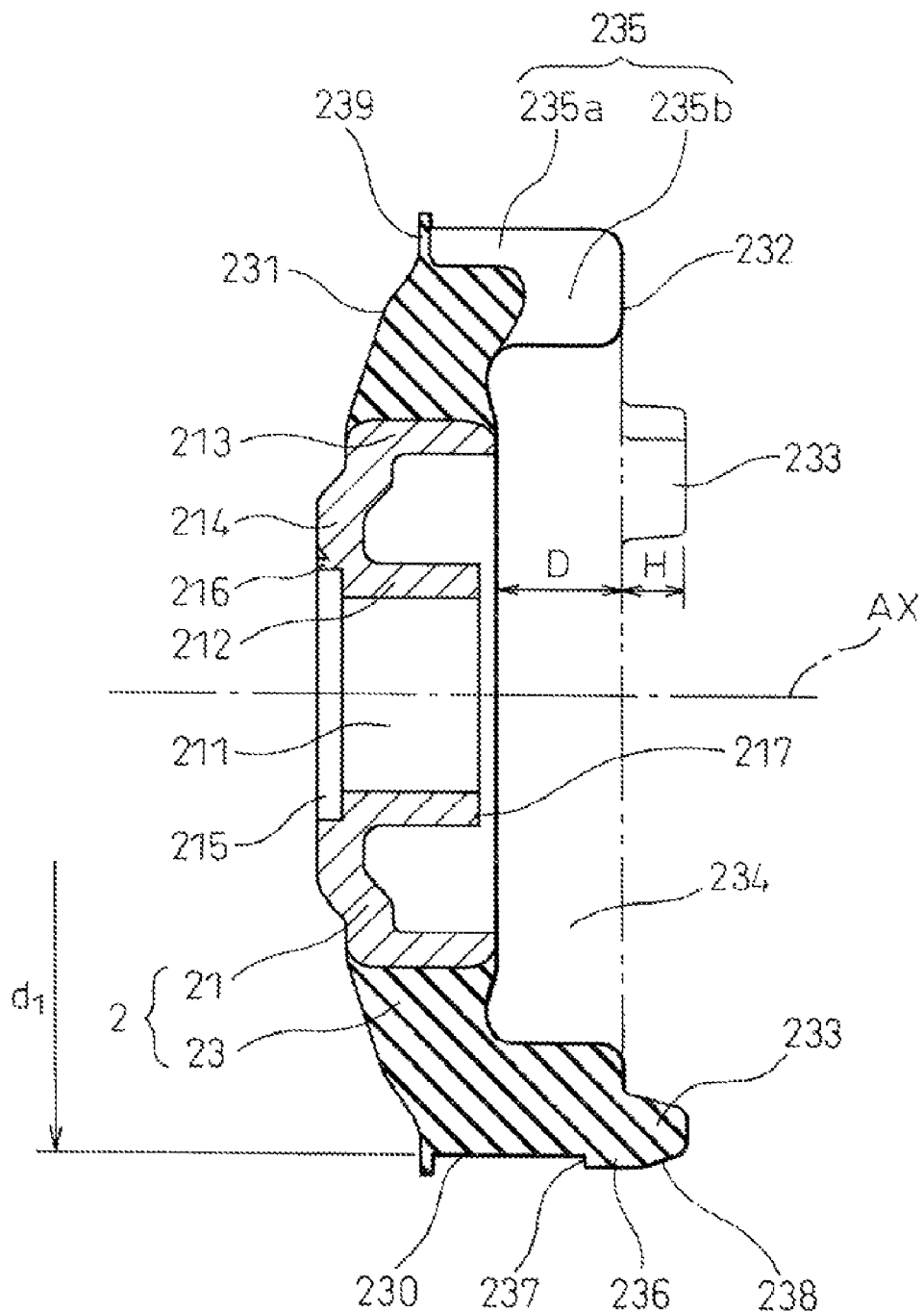
FIG. 4 is a longitudinal sectional view of the hub taken along line I-I in FIG. 3.

Next, hub 2 is explained with reference to the front view of FIG. 3 taken from the rear side thereof and the longitudinal sectional view of FIG. 4 taken along line I-I in FIG. 3. Hub 2 is composed of inner hub 21 and outer hub 23 formed of an elastic material such as rubber for torque transmission and buffering. Inner hub 21 is formed of an inner cylindrical portion 212 making up a center hole 211 into which smaller diameter portion 32 of torque limiter 3 is inserted, an outer cylindrical portion 213 and a joint portion 214 extending in radial direction on the front side in such a manner as to couple inner cylindrical portion 212 and outer cylindrical portion 213. The front end surface of inner cylindrical portion 212 is formed with a circular depression 215 adapted to be fitted by hexagonal flange portion 31 of power shutoff member 3. In fixing hub 2 on rotary shaft 4, hexagonal flange portion 31 of power shutoff member 3 is fitted in circular depression 215, after which four caulking portions 216 around circular depression 215 are plastically deformed to fix power shutoff member 3 and hub 2 in axial direction. Also, a bearing surface 217 formed on the rear end surface of inner cylindrical portion 212 is in contact with the end surface of washer 7.

Outer hub 23 is substantially in the shape of a cylinder including, at the central portion thereof, a front end surface 231 tilted about 15 degrees rearward with respect to the line perpendicular to the center axis AX, a rear end surface 232 substantially perpendicular to the center axis AX and a coupling hole for coupling inner hub 21. The end surfaces of substantially cylindrical protrusions 235 having the height of D are formed in a circle at rear end surface 232. The inner peripheral sides of protrusions 235 arranged in a circle form a depression 234 as viewed from rear end surface 232. Rear end surface 232 is formed with axial protrusions 233 protruded axially to the height of H. According to this embodiment, three axial protrusions 233 are formed at equal angular intervals. According to this embodiment, depression 234 not only provides a space for bearing 5 and boss portion 61 to hold bearing 5 but also promotes the radially inward elastic deformation of first stepped portion 237 described later.

According to this embodiment, outer hub 23 includes a series of 15 protrusions 235 arranged in ring form around center axis AX. Protrusions 235 are composed of diametrical protrusions formed between a plurality of first grooves 235a extending axially along the outer peripheral surface of outer hub 23 and axial protrusions formed between a plurality of second grooves 235b extending radially along rear end surface 232 of outer hub 23. First grooves 235a and second grooves 235b have the same angular position in circumferential direction and the same groove width on the one hand, and cross each other at right angles thereby to form one continuous protrusion 235 of the diametrical protrusions and the axial protrusions on the other hand. First grooves 235a are not formed through the whole axial width of outer hub 23, but a filmy part 239 remains in the neighborhood of front end surface 231. This filmy part 239 is for preventing dust and dirt from intruding into first grooves 235a.

Outer hub 23 is formed with three first protrusions 236 protruded radially from outer peripheral surface 230 of the diametrical protrusions having the diameter d1 and arranged at circumferential intervals of 120 degrees in the neighborhood of rear end surface 232. According to this embodiment, first protrusions 236 are arranged at the same angular position as three axial protrusions 233. Each first protrusion 236 has a first stepped portion 237 rising vertically from outer peripheral surface 230 on the front side and a first inclined transition portion 238 formed of a slope of about 30 degrees with respect to the center axis on the rear side thereof. First stepped portions 237 make up the engaging means constituting the feature of this invention together with second stepped portions 16 formed on the pulley side described later.

Returning again to FIG. 1, pulley 1 has a series of depressions 14 fitted on the series of hub-side protrusions 235 between rim portion 11 and annular rib portion 12. Depressions 14 are each composed of a first rib portion 14a projected radially from the inner peripheral surface of rim portion 11 and extending axially in such a manner as to fit in first grooves 235a making up hub protrusions 235, and a second rib portion 14b projected axially toward the front side from disk portion 13 and extending radially in such a manner as to fit in second grooves 235b. First and second rib portions 14a, 14b have the same angular position in circumferential direction and the same rib width while at the same time crossing each other orthogonally to form one continuous rib portion.

As shown in FIG. 5 more in detail than in FIG. 1, rim portion 11 of the pulley has second protrusions 15 radially projected from the inner peripheral surface thereof at a position somewhat near the front side from the center of rim portion 11. Like first protrusions 236 of the hub, three second protrusion 15 are formed at intervals of 120 degrees. Second protrusions 15 each have a second stepped portion 16 formed in radial direction and rising vertically from the inner peripheral surface of rim portion 11 on the rear side, and also have a second inclined transition portion 17 making up a slope on the front side. The inner diameter of second protrusions 15 is slightly larger than the diameter d1 of the outer peripheral surface 230 of outer hub, and the inner diameter of rim portion 11 is slightly larger than the outer diameter of first protrusion 236 of the outer hub. When the hub is fitted on the pulley, an axial gap C is formed between second stepped portions 16 on pulley side and first stepped portions 237 on hub side.

Three coupling holes 18 are formed through disk portion 13 of the pulley at the same circumferential angular position as second protrusions 15, and fitted with three axial protrusions 233 of outer hub 23.

Hub 2 and pulley 1 are configured as described above. Therefore, an engaging structure is formed by locating first stepped portions 237 nearer to the rear side than second stepped portions 16. At the same time, a torque transmission structure is formed by the engagement between fifteen protrusions 235 formed on outer hub 23 and fifteen depressions 14 formed on pulley 1 on the one hand and the engagement between three axial protrusions 233 of outer hub 23 and coupling hole 18 of pulley 1 on the other hand. The torque is transmitted through the contact surface between depressions 14 and protrusions 235 and the contact surface between axial protrusions 233 and coupling hole 18.

In the case where annular notch portion 35 of the power shutoff member is broken by excessive torque, the hub moves slightly toward the front side by the distance equal to gap C. However, further movement, is prevented by hub-side first stepped portions 237 and pulley-side second stepped portions 16 in contact with each other, thereby preventing the hub from coming off from pulley.

According to this embodiment, first protrusions 237 of outer hub 23 can be elastically deformed considerably radially inward not only by the fact that first protrusions 237 are formed on outer peripheral surface 230 of outer hub 23, but also by the effect of depressions 234 on the one hand, while first protrusions 237 are so shaped as not to be easily deformed in axial direction on the other hand. When assembling the apparatus by fitting hub 2 on pulley 1, first protrusions 236 of outer hub 23 are required to be formed over second protrusions 15 of the pulley. According to this embodiment, outer hub 23, when overriding second protrusions 15, is elastically deformed radially inward but not substantially in axial direction, and therefore can be assembled easily and positively. The large radially inward elastic deformability can also produce an engaging structure of first and second stepped portions having a high engaging capability.

The die to form outer hub 23 according to this embodiment is simplified in structure as compared with the die for hub-side convexo-concave 201 having protrusion 205 in the prior art shown in FIG. 6. With regard to the die for the pulley, second protrusions 15 and coupling hole 18 have the same angular position, and therefore the complication of the die structure which otherwise might be caused by the slide structure required to form second protrusions 15, for example, can be avoided.

While the invention has been described with reference to specific embodiments chosen for purposes of illustration, it should be apparent that numerous modifications could be made thereto by those skilled in the art without departing from the basic concept and scope of the invention.

The invention claimed is:

1. A power transmission apparatus comprising:
   a pulley mounted rotatably on a casing of a rotary device having a rotary shaft;
   a hub coupled to the pulley by fitting between depressions and protrusions to transmit the torque with the pulley;
   a power shutoff member for shutting off the transmission of an excessive torque between the rotary shaft and the hub; and
   an engaging device for causing the hub to engage the pulley to prevent the hub from coming off from the pulley after activation of the power shutoff member;
   wherein the engaging device includes a first stepped portion formed in radial direction on the outer periphery of the hub and a second stepped portion formed in the radial direction on the inner peripheral wall of a rim portion of the pulley to engage the first stepped portion in axial direction,
   wherein the hub includes an elastic member having at least one protrusion adapted to be fitted in at least one depression of the pulley to transmit the torque with the pulley, and
   wherein the first stepped portion is formed on the elastic member.

2. The power transmission apparatus according to claim 1,
   wherein the pulley includes a disk portion extending in the radial direction and at least one coupling hole formed through the disk portion, and
   wherein the hub has at least one axial protrusion projected in axial direction from one end surface of the hub facing the disk portion of the pulley and adapted to fit in the coupling hole.

3. The power transmission apparatus according to claim 1,
   wherein the pulley includes a disk portion extending in the radial direction and at least one coupling hole formed through the disk portion, and
   wherein the coupling hole formed in the pulley and the second stepped portion have the same angular position along the circumferential direction.

4. The power transmission apparatus according to claim 2,
   wherein a plurality of the coupling holes and axial protrusions are formed in spaced relation with each other along the circumferential direction.

5. The power transmission apparatus according to claim 3,
   wherein a plurality of the engaging devices and coupling holes are formed in spaced relation with each other along the circumferential direction.

6. The power transmission apparatus according to claim 1,
   wherein the power shutoff member includes a screw portion and a breakable portion adapted to break under the axial force generated by the rotation and advance of the screw portion under excessive torque.

7. The power transmission apparatus according to claim 6,
   wherein the power shutoff member has a stepped form including a larger diameter flange portion and a smaller diameter portion,
   wherein the screw portion is formed in the center hole along the center axis, and
   wherein the breakable portion includes an annular notch portion formed on the smaller diameter portion and further smaller in diameter than the smaller diameter portion.

8. The power transmission apparatus according to claim 2,
   wherein the axial protrusion is formed on the elastic member.

* * * * *